April 8, 1924.  
C. WILHJELM  
CONTROL THERMOMETER  
Filed Sept. 9, 1922  
1,489,911
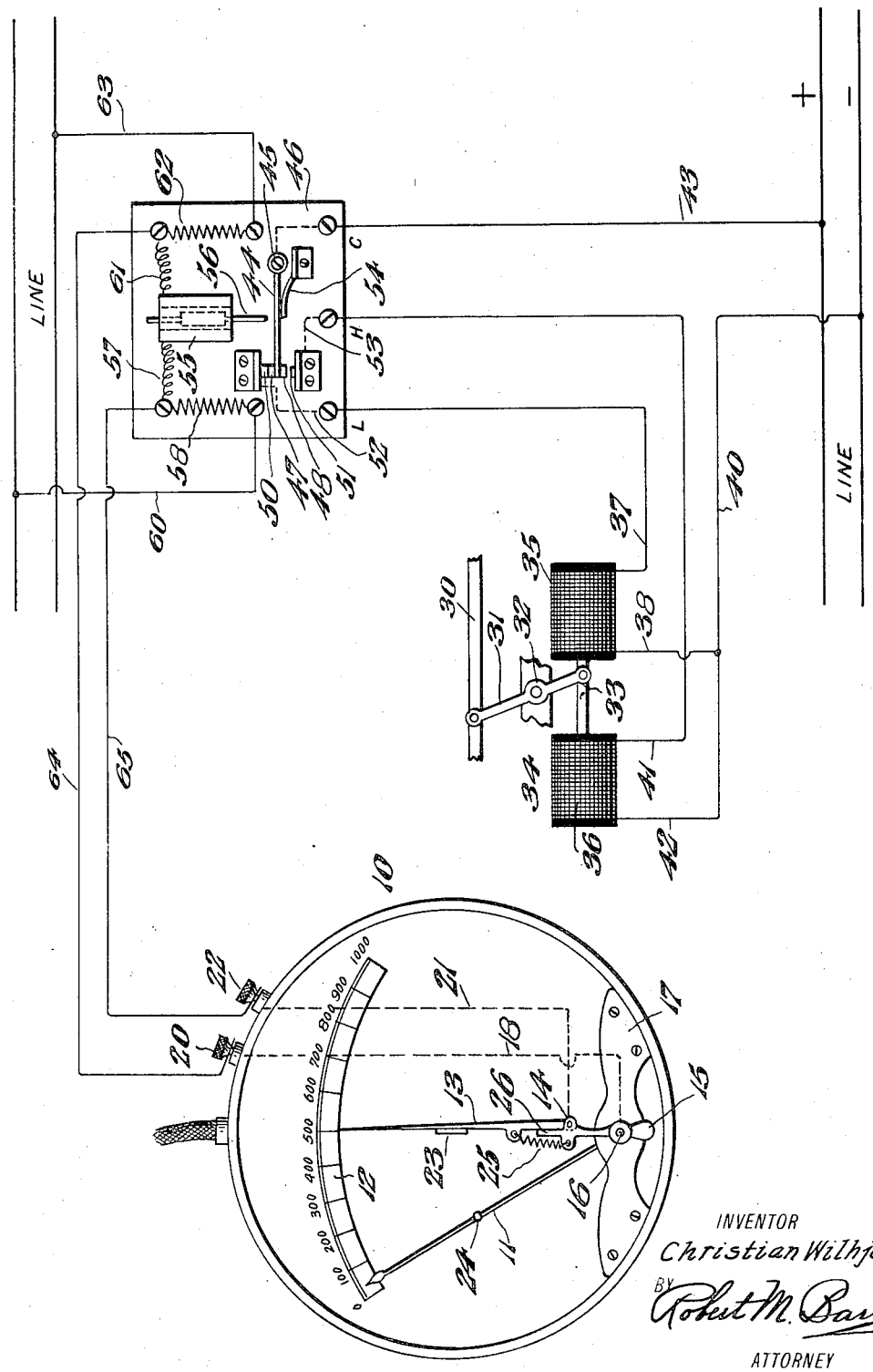
INVENTOR  
*Christian Wilhjelm*  
BY  
*Robert M. Barr*  
ATTORNEY Patented Apr. 8, 1924.

1,489,911

UNITED STATES PATENT OFFICE.

CHRISTIAN WILHJELM, OF PHILADELPHIA, PENNSYLVANIA, ASSIGNOR TO THE BROWN INSTRUMENT COMPANY, OF PHILADELPHIA, PENNSYLVANIA, A CORPORATION OF PENNSYLVANIA.

CONTROL THERMOMETER.

Application filed September 9, 1922. Serial No. 587,253.

*To all whom it may concern:*

Be it known that I, CHRISTIAN WILHJELM, a subject of the King of Denmark, and a resident of Philadelphia, county of Philadelphia, State of Pennsylvania, have invented certain new and useful Improvements in Control Thermometers, of which the following is a specification.

Some of the objects of the present invention are to provide an improved measuring instrument for controlling the temperature of a furnace or other heating unit; to provide a control instrument responsive to temperature changes for maintaining a substantially uniform temperature in a heating unit; to provide a contact control for an instrument wherein the danger of short circuits at the instrument is reduced to a minimum; to provide means for preventing sparking and wear at the contacts of a temperature control instrument; to provide means for maintaining a predetermined maximum temperature in a heating unit; to provide a control instrument wherein vibrations due to alternating current are eliminated; and to provide other improvements as will hereinafter appear.

In the accompanying drawings, the figure represents diagrammatically a control thermometer embodying one form of the present invention.

Referring to the drawings, one form of the present invention comprises a temperature measuring instrument 10 having a movable pointer 11, arranged in conjunction with a suitably graduated scale 12 to indicate the temperature of a given zone of heat. The pointer 11 may be operated by any well known form of apparatus, so that it assumes positions on the scale 12 corresponding respectively to the variation of temperature of the zone being measured. Such apparatus may, for example, be of the Bourdon tube pressure actuated type, or electrically responsive means, or any other mechanism or system wherein a movable element is shifted to assume a position or positions corresponding to temperature conditions. In the form of the invention shown, the scale 12 is graduated from zero degrees to one thousand degrees, though this is only representative for the purpose of explaining the invention.

For the purpose of employing the instrument 10 as a control for maintaining a predetermined and substantially uniform maximum temperature in a furnace or heat zone, it is provided with a control arm 13 pivoted at 14 to a handle part 15, which is pivoted to a stud 16 in coaxial relation with respect to the axis of rotation of the pointer 11. The stud 16 is mounted upon a bridge-piece 17 of bakelite or other insulating material, and the arrangement is such that the pointer 11 and arm 13 are completely insulated from each other and form terminals of an electrical circuit including a conductor 18 connecting the pointer 11 with a binding post 20, and a conductor 21 connecting the arm 13 with a binding post 22. A contact plate 23 is fixed to the arm 13 in the path of movement of a contactor pin 24 fixed to the pointer 11, so that the control circuit is closed by contact of the pin 24 and plate 23 as will be explained.

While the arm 13 is arranged to be moved to a graduation on the scale 12 corresponding to the desired maximum temperature of the furnace or heating unit, and to remain in such position to control the limit of heating, it is desirable, in case the temperature should rise above that fixed limit, to permit the pointer 11 to continue its movement. For this purpose the arm 13 is pivoted at 14 to the handle 15 and a spring 25 is provided between the arm 13 and handle 15 to hold the arm 13 in radial alinement with the handle 15 and against a stop lug 26 on the handle 15. By this arrangement the pointer 11 not only moves under increase of temperature into contact with the arm 13, but is also free to continue its movement should the temperature rise above the fixed maximum, because the arm 13 is then swung about its pivot 14 by the pressure of the pointer 11. It will be understood that the spring 25 is a relatively light one having sufficient elasticity to return the arm 13 to its normal position but insufficient to place any drag upon the pointer 11.

For furnace control purposes a reciprocable rod 30 is provided, the movement of which can be arranged to open and close a fuel valve, or operate an electric switch, or cause any other mechanism to function, whereby the heating of a furnace or other unit is controlled. In the present construction, shown by way of example, the rod 30 is arranged to be actuated by a lever arm 31 pivoted at 32 to a fixed part and having its ends respectively connected to the rod 30 and to the common core 33 of a double coil solenoid 34. The windings 35 and 36 of the solenoid 34 are reversely wound with respect to each other, the winding 35 having one end connected to a conductor 37 and the other end connected by a conductor 38 to a common return conductor 40; and the winding 36 having one end connected to a conductor 41, and its other end connected, by a conductor 42, to the return conductor 40, which leads to one side of the service line. The opposite side of the service line is connected by a conductor 43 and the post C to a switch or contactor arm 44 which is pivoted at 45 to a base 46, preferably of insulating material. This switch arm 44 is provided with two contactors 47 and 48 oppositely disposed with respect to the arm 44 and in position, respectively, to engage two fixed contacts 50 and 51 in accordance with the position of the arm 44. The contact 50 is electrically connected by a conductor 52 and post L to the conductor 37, and the contact 51 is electrically connected by a conductor 53 and post H to the conductor 41. The switch arm 44 thus forms part of a selecting means whereby one or the other of the two solenoid control circuits is closed to cause a predetermined movement of the control rod 30.

In order to move the switch arm 44 in one direction, a strip of spring material 54 fixed at one end is arranged to bear against the arm 44, and in the present instance normally maintains the arm 44 in position to make contact between the contactor 47 and the contact 50 whereby the circuit including the low temperature solenoid winding 35 is closed so that the control rod 30 is in the furnace operating position.

In order to move the switch arm 44 in the opposite direction an electrical device controlled from the instrument 10 is employed. As here shown, this comprises a relay coil 55, so fixed as to position that its core 56 is alined with the switch arm 44 and under deenergized condition of said relay coil engages said arm 44 and moves it against the tension of spring 54 to break contact between the contactor 47 and contact 50 and make contact between the contactor 48 and the contact 51. The weight of the core 56 is arranged to overcome the spring tension of the strip 54, so that the arm 44 can be properly shifted to the other control position. One end of the winding of the relay coil 55 is connected by a conductor 57 through a non-inductive resistor 58 and a conductor 60 to one side of the service line, and the other end of its winding is connected by a conductor 61 through a non-inductive resistor 62 and a conductor 63 to the other side of the service line. Thus, normally, the relay coil 55 is maintained energized by current from the line and its core 56 is held away from the switch arm 44.

As a means for deenergizing the relay coil 55, a conductor 64 extends from the conductor 61 to the binding post 20 of the instrument 10, and a conductor 65 extends from the conductor 57 to the binding post 22. These conductors 64 and 65 with the conductors 18 and 21 form a circuit which short circuits the relay coil 55 when the pointer pin 24 contacts with the plate 23, that is, when the maximum temperature has been reached.

The resistors 58 and 62 are designed to introduce sufficient resistance into the instrument contact circuit to lower the potential at the plate 23 and pin 24 to a negligible amount, and in consequence there is practically no chance of a short circuit between either conductor and the instrument case or other part which may be grounded. Furthermore, with such a low potential there is no sparking or disintegration of the contact points. Also, this resistance in series with the relay coil 55 allows sufficient current to pass through the coil winding to hold the core 56 firmly within the coil so that it is subject only to a minimum vibratory action caused by an alternating current. In this energized condition of the coil 55, the lower end of the core 56 is spaced from the switch arm 44 and consequently the minor vibration of the core cannot be transmitted to the arm 44 to cause sparking at the contact 50.

The operation of the instrument is as follows:—In the position of the parts, as shown in the figure, the heating unit is in operation, and hence the relay coil 55 is energized to hold the core 56 away from the switch arm 44. The spring 54, therefore, is holding the contactor 47 of the arm 44 in contact with the contact 50, and consequently the solenoid coil 35 is energized to hold the control rod 30 in position to cause the heating means to function. As the temperature of the furnace or other heating device increases, the pointer 11 moves toward the arm 13 until the pin 24 engages the plate 23 on the arm 13 when the circuit including conductors 64 and 65 is closed. This results at once in a short circuit around the relay coil 55, which becomes deenergized and its core 56 drops by gravity to engage and shift the switch arm 44 from contact 50 to contact 51. The winding 35 therefore becomes deenergized and the winding 36 energized, and in consequence the lever arm 31 shifts the control rod 30 in the direction to shut down the heating device. In case the temperature should rise slightly above the maximum before the shutting down of the heating unit becomes effective, the pointer 11 is still free to continue its indicating movement because the control arm 13 can swing with the pointer 11. As soon as the temperature falls below the maximum, as a result of shutting down the heating unit, the pointer 11 moves away from the arm 13 and breaks the circuit at pin 24 and plate 23. The relay coil 55 then becomes energized, and retracts the core 56 so that the arm 44 returns, under the influence of spring 54, to its normal position with the low temperature circuit closed through contactor 47 and contact 50.

By the foregoing construction it is possible to obtain a substantially uniform maximum temperature because the instrument controls by a single contact control arm arranged to be fixed at any predetermined maximum temperature, and the instant this contact is made or broken the corresponding necessary furnace action takes place.

Heretofore temperature control instruments have been constructed which employ a contact carried by a pointer and arranged to coact with two contacts spaced at either side of the pointer, one of which is arranged to close a circuit to increase the temperature of a furnace and the other to close a circuit to decrease the temperature of the furnace. As a result, the pointer must move an appreciable distance after breaking with the high temperature contact before it engages and makes contact with the low temperature contact, so that there is a considerable time lag for either condition and wide fluctuations of temperature occur. The present construction obviates such fluctuations in temperature because at the instant the temperature reaches its maximum the furnace heating means shuts down and at the instant the temperature lowers to the point of breaking the control contact the furnace heating means again becomes operative to restore conditions. The result is to give a uniform temperature in the furnace and one which can be fixed at any selected maximum.

The control arm 13 of the present invention may also function as a safety cut out for a furnace in case anything goes wrong with the system and the temperature should rise above that intended for use under normal conditions.

Furthermore, by the provision of a relay mechanism including resistors of predetermined ohmic resistance, all major or high potential circuits are located outside of and electrically separate from the instrument employed as a temperature indicator and control so that grounding and short circuiting through the instrument are prevented, as well as the elimination of sparking and wear at the circuit contact terminals.

It will be understood that the solenoid structure 34 is only shown by way of example, and that the windings thereof may be of any standard construction and not necessarily of the reversely wound type.

While but a single form is shown in which this invention may be embodied, it is to be understood that the invention is not limited to any specific construction, but might be applied in various forms without departing from the spirit of the invention or the scope of the appended claims.

Having thus described my invention, I claim:

1. In a control system, the combination of a mechanism for controlling the source of heat to a heating zone, a measuring instrument provided with a pointer for indicating the temperature of said zone, a normally energized relay coil, means including a contact arm to cooperate with said pointer when the temperature reaches a predetermined limit to short circuit said relay coil, and means controlled by said relay for operating said mechanism.

2. In a control system, the combination of a mechanism for controlling the source of heat to a heating zone, a measuring instrument provided with a pointer for indicating the temperature of said zone, a relay coil, means including a contact arm to cooperate with said pointer when the temperature of said zone reaches a predetermined limit to operate said relay coil, and means including a plurality of circuits and a selecting element controlled by said relay coil for operating said mechanism.

3. In a control system, the combination of a mechanism for controlling the source of heat to a heating zone, a measuring instrument provided with a pointer for indicating the temperature of said zone, a relay coil, means including a contact arm to cooperate with said pointer when the temperature reaches a predetermined limit to actuate said relay coil, means controlled by said relay for operating said mechanism, and means to prevent sparking between said pointer and contact arm.

4. In a control system, the combination of a mechanism for controlling the source of heat to a heating zone, electrically operated means for actuating said mechanism, a measuring instrument, a control circuit having terminals at said instrument, means in said control circuit for maintaining a relatively low potential at said terminals, means in said instrument responsive to the temperature in said heat zone for causing said terminals to either make or break said control circuit, and means controlled by said control circuit for selectively actuating said electrically operating means.

5. In a control system, the combination of a mechanism for controlling the source of heat to a heating zone, electrically operated means for actuating said mechanism, a measuring instrument, a control circuit having terminals at said instrument, means in said control circuit for maintaining a relatively low potential at said terminals, means in said instrument responsive to the temperature in said heat zone for causing said terminals to either make or break said control circuit, and means including a relay controlled by said control circuit for selectively actuating said electrically operated means.

6. In a control system, the combination of a mechanism for controlling the source of heat to a heating zone, electrically operated means for actuating said mechanism, a measuring instrument, a control circuit having terminals at said instrument, means in said control circuit for maintaining a relatively low potential at said terminals, means in said instrument responsive to the temperature in said heat zone for causing said terminals to either make or break said control circuit, and means including a normally energized relay controlled by said control circuit for selectively actuating said electrically operated means.

7. In a control system, the combination of means including a pair of electrical circuits for respectively actuating a heat control mechanism, a switch arranged to separately close both of said circuits, means for holding said switch to normally close one of said circuits, a relay coil adjacent said switch having a weighted core arranged to engage said switch in opposition to said holding means, a circuit normally energizing said coil to hold said core away from said switch, a measuring instrument, and means in said instrument and operated in response to temperature in a heat zone for short circuiting said energizing circuit whereby said core drops by gravity to break said normally closed circuit and close the other of said pair of circuits.

8. In a control system, the combination of means including a pair of electrical circuits for respectively actuating a heat control mechanism, a switch arranged to separately close both of said circuits, means for holding said switch to normally close one of said circuits, a relay coil adjacent said switch having a weighted core arranged to engage said switch in opposition to said holding means, a circuit normally energizing said coil to hold said core away from said switch, a measuring instrument, means in said instrument and operated in response to temperature in a heat zone for short circuiting said energizing circuit whereby said core drops by gravity to break said normally closed circuit and close the other of said pair of circuits, and means to prevent vibratory movement of said core.

9. In a control system, the combination of means including a pair of electrical circuits for respectively actuating a heat control mechanism, a switch arranged to separately close both of said circuits, means for holding said switch to normally close one of said circuits, a relay coil adjacent said switch having a weighted core arranged to engage said switch in opposition to said holding means, a circuit normally energizing said coil to hold said core away from said switch, a measuring instrument, means in said instrument and operated in response to temperature in a heat zone for short circuiting said energizing circuit whereby said core drops by gravity to break said normally closed circuit and close the other of said pair of circuits, and resistors associated with said relay coil to prevent vibratory movement of said core.

10. In a control circuit, the combination of a mechanism for controlling the source of heat to a heating zone, separate means for respectively causing said mechanism to increase the supply of heat and to decrease the supply of heat, a measuring instrument provided with a pointer for indicating temperatures, an adjustable contact arm in said instrument, an electrical circuit including said pointer and contact arm as terminals, and means controlled by said circuit for selectively actuating said mechanism means whereby contact between said pointer and arm causes the heat decreasing means to function and the breaking of the contact between said pointer and arm causes said heat increasing means to function.

Signed at Philadelphia, in the county of Philadelphia and State of Pennsylvania, this 22d day of August, 1922.

CHRISTIAN WILHJELM.